United States Patent [19]

Chen et al.

[11] Patent Number: 5,548,474
[45] Date of Patent: Aug. 20, 1996

[54] ELECTRICAL COMPONENTS SUCH AS CAPACITORS HAVING ELECTRODES WITH AN INSULATING EDGE

[75] Inventors: Chorng-Jeou Chen; Richard Ladew; Yong-Jian Qiu, all of Myrtle Beach; Jeffrey Mevissen, Conway, all of S.C.

[73] Assignee: AVX Corporation, Myrtle Beach, S.C.

[21] Appl. No.: 204,003

[22] Filed: Mar. 1, 1994

[51] Int. Cl.$^6$ ............................ H01G 4/06; H01G 4/005
[52] U.S. Cl. ............................................ 361/313; 361/303
[58] Field of Search ................................ 361/303–305, 361/311–313, 321.1, 321.2, 321.3, 321.4, 321.5; 29/25.42

[56] References Cited

U.S. PATENT DOCUMENTS

| | | |
|---|---|---|
| 3,457,614 | 7/1969 | Tibol . |
| 3,469,294 | 9/1969 | Hayashi et al. . |
| 4,189,760 | 2/1980 | Marshall . |
| 4,241,378 | 12/1980 | Dorrian . |
| 4,347,650 | 9/1982 | McLarney et al. . |
| 4,453,199 | 6/1984 | Ritchie et al. . |
| 4,607,316 | 8/1986 | Wada et al. . |
| 4,613,518 | 9/1986 | Ham et al. . |
| 4,741,077 | 5/1988 | Langlois . |
| 4,771,520 | 9/1988 | Tanaka et al. . |
| 4,906,512 | 3/1990 | Roess . |
| 4,924,064 | 5/1990 | Stormbom et al. . |
| 4,931,899 | 6/1990 | Pruett . |
| 4,959,748 | 9/1990 | Kimura et al. . |
| 5,101,319 | 3/1992 | Diffeyes et al. . |

*Primary Examiner*—Bot L. Ledynh
*Attorney, Agent, or Firm*—Loeb & Loeb LLP

[57] ABSTRACT

A marginless electrical component, such as a capacitor, is fabricated by providing a multilayer body of electrodes and dielectric with an insulating layer on alternate electrodes on each terminated surface.

19 Claims, 3 Drawing Sheets

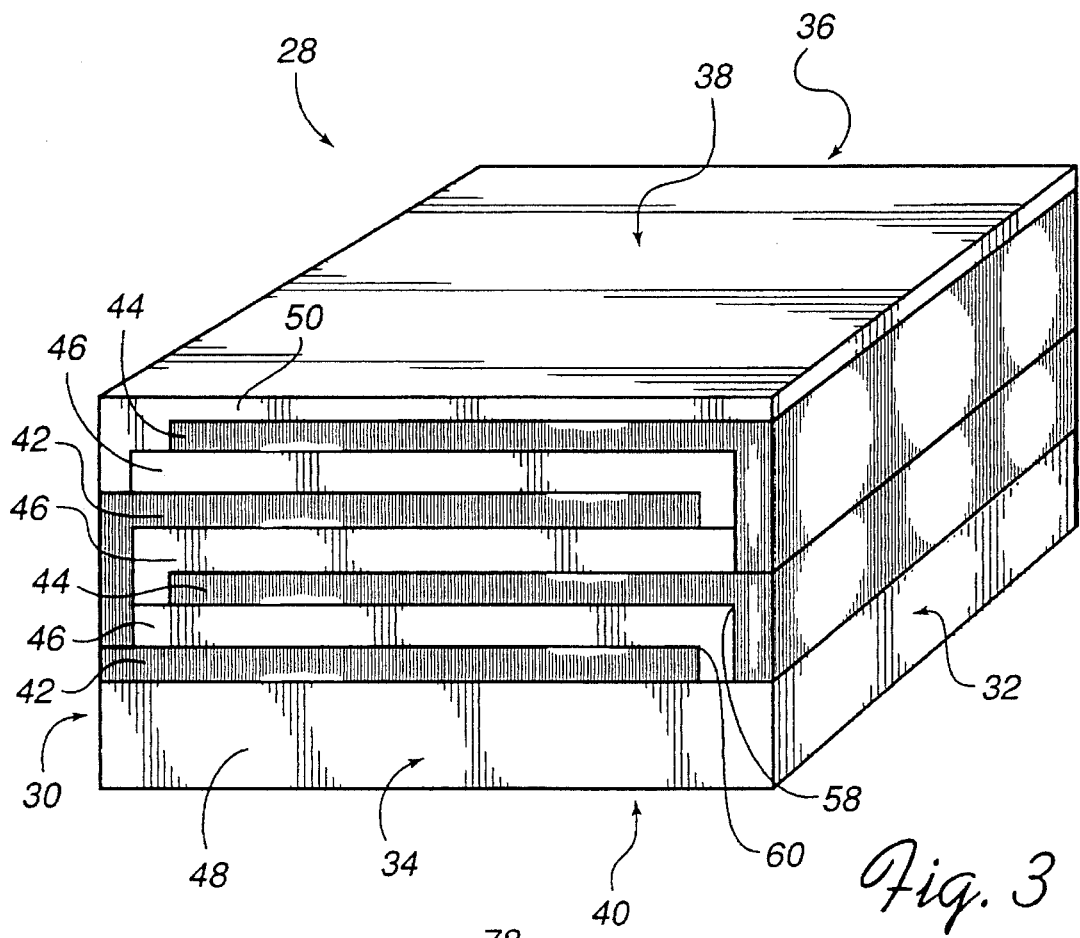
Fig. 3
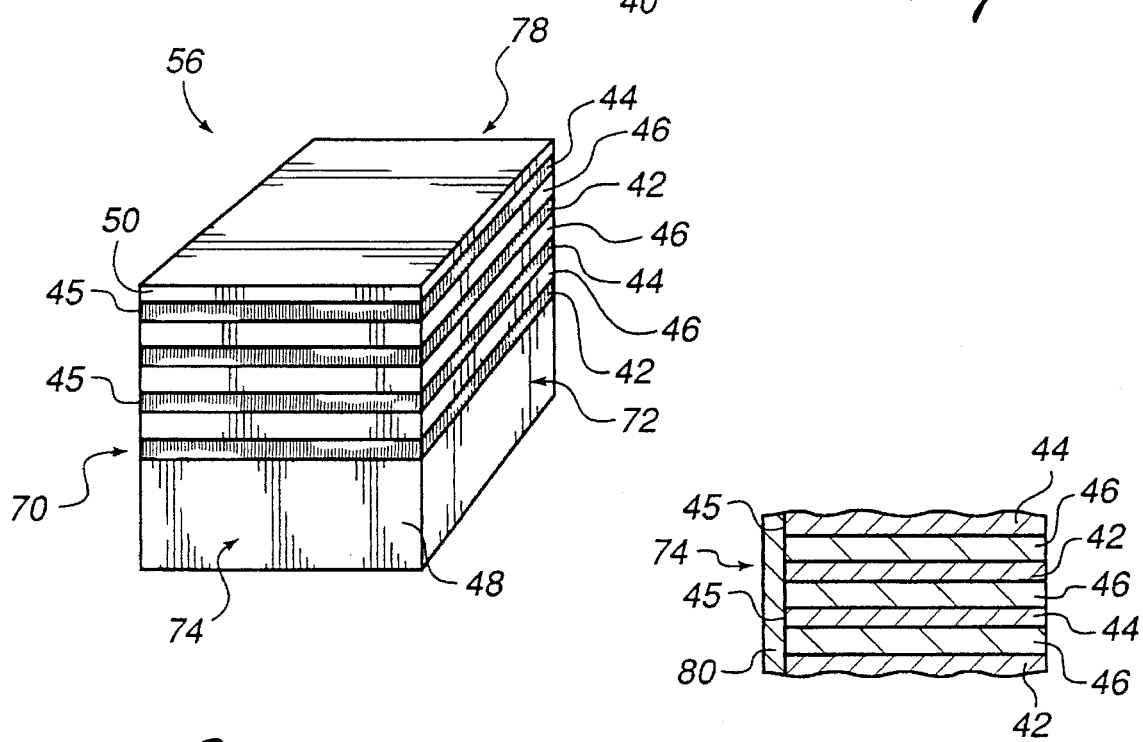
Fig. 4a
Fig. 4b

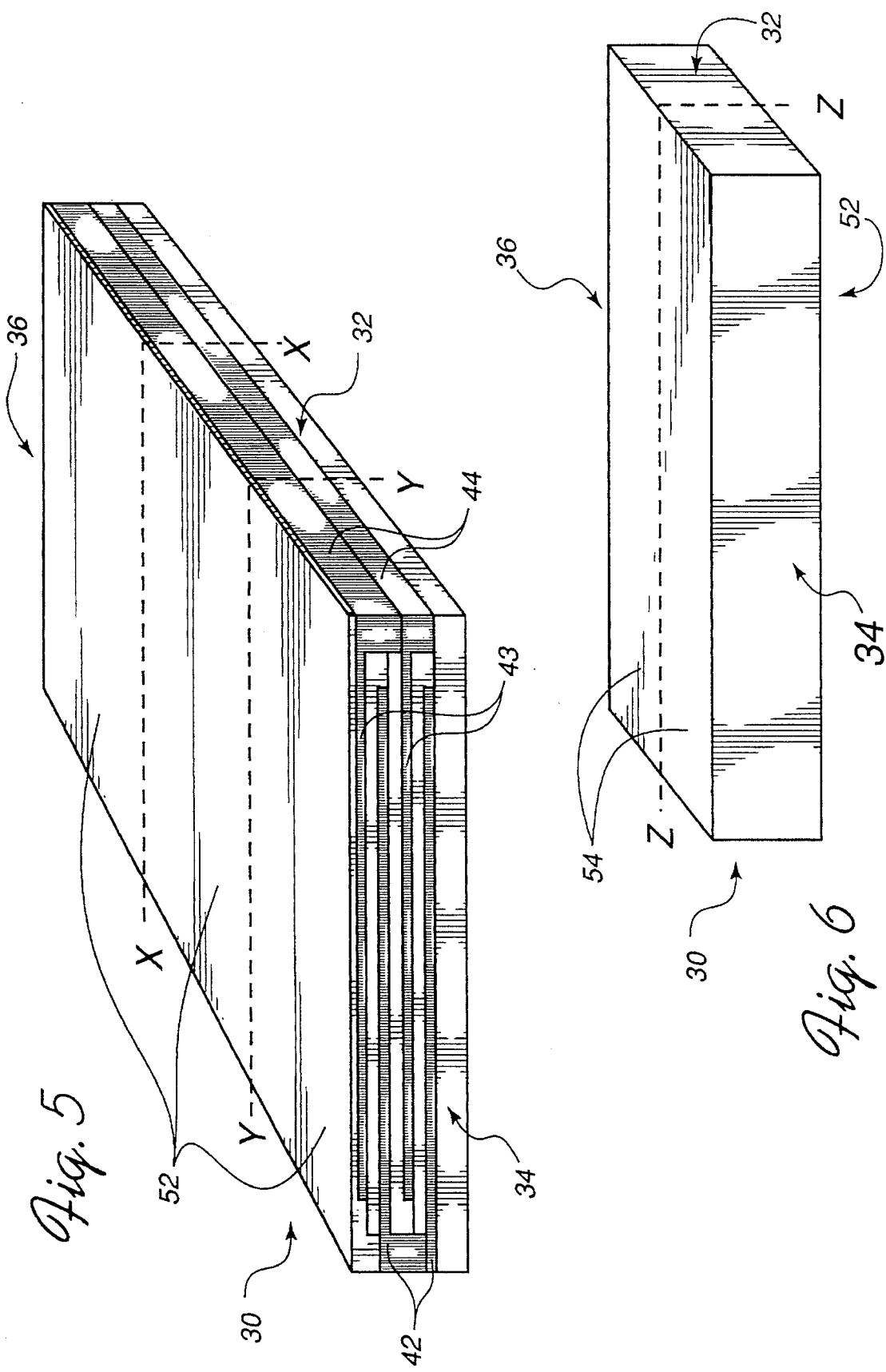

ELECTRICAL COMPONENTS SUCH AS CAPACITORS HAVING ELECTRODES WITH AN INSULATING EDGE

BACKGROUND OF THE INVENTION

1. Field of the Invention

The present invention relates to marginless multilayer electrical components, such as capacitors, and to methods for their manufacture.

2. The Related Art

There are numerous ways to construct electrical components such as ceramic capacitors. In a conventional multilayer capacitor-making process, green (unfired) ceramic sheets having thicknesses of several hundred micrometers or less are prepared by tape casting, for example. Noble metal electrodes are screen printed onto the green ceramic by means of a conductive ink. The metals used must have relatively high melting points and be nonreactive at elevated temperatures, to withstand the high temperatures needed to sinter the dielectric. As a result, expensive metals such as platinum or palladium are often used.

Thereafter sheets of green ceramic and electrodes are stacked on top of each other, with the electrodes staggered and partially overlapping each other, such that every other electrode extends to one side edge of the ceramic. Every electrode has one side edge which extends to one side edge of the ceramic, and an opposing side edge which remains within the ceramic. The region between the electrode side edge remaining within the ceramic and the side edge of the ceramic is known as an end margin.

In addition, the side margins are sometimes left between the front and back electrode edges and the front and back edges of the ceramic in order to protect the capacitor against undesired electrical shorting between electrode layers.

The stacks are then cut and fired at temperatures of up to 1350° C. or higher, depending on the dielectric used, in order to properly sinter the ceramic dielectric. The ends of the device are then coated or terminated with a conductive metal or mixture, to connect the alternate electrodes.

One factor which determines the electrostatic capacity obtained from the capacitor is the area of overlapping between the electrode and the dielectric. The larger the area of overlap, the greater the capacitance. However, because of the presence of end margins and side margins, the total area of the ceramic layers cannot be made to contribute to the capacitance. In addition, the capacitive value of each chip is also dependent on the precision with which adjacent layers are oriented to one another.

The difficulties and costs inherent in the outlined manufacturing steps are multiplied when it is desired to produce capacitors or other devices to close tolerances.

For close tolerance operations, one method used is to manufacture capacitors with capacitance exceeding the desired value. After the capacitor is formed the overlap area of the electrodes is eroded or worn-away as by a sand blasting jet directed normal to the broad surface of the capacitor, so as to reduce capacitance to the desired value. These manufacturing steps will often significantly increase the cost of the capacitor.

U.S. Pat. No. 4,453,199 to Ritchie et al. describes a method of forming, by vapor deposition or the like, discrete electrode areas on an insulating substrate, and depositing a dielectric layer over the electrodes and the areas between the electrodes. A series of electrodes is formed over the dielectric in partial registry with the first set of electrodes, and the device is then diced to expose opposite edge portions of the resultant capacitors.

U.S. Pat. No. 4,771,520 to Tanaka discloses a method of producing laminated multilayer ceramic capacitors in which a stack of green sheets and electrodes is cut so as to expose the electrodes on the lateral surfaces, which are coated with a ceramic slurry. Then the resultant bodies are cut into chips and terminated on their opposing side surfaces.

U.S. Pat. Nos. 3,469,294 to Hayashi et al. and 3,457,614 to Tibol describe methods for making capacitors in which a metal electrode is anodized to form a dielectric layer, then another electrode layer is deposited on top of the dielectric layer.

It would be desirable to construct a marginless, close tolerance capacitor requiring fewer processing steps than the conventional methods outlined above. In addition, it would be desirable to replace precious metals used for electrodes with less expensive metals. It is to these types of objectives that the present invention is directed.

SUMMARY OF THE INVENTION

The present invention provides a fabrication method for producing devices, such as capacitors, with no margins, requiring relatively few steps, and allowing for the use of inexpensive electrode materials.

In accordance with one embodiment of the present invention, there is provided a method for fabricating electrical components from a body having layers of electrode and dielectric material by connecting a first set of alternate electrode layers to an electrochemical cell to act as an anode, and anodizing the first set of alternate electrode layers so that an insulating coating is formed on edges of the first set of alternate electrode layers. Then opposing edges of the body are terminated.

Next the body is sliced into smaller bodies along a direction parallel to the terminated edges such that the smaller bodies have one terminated edge and an opposing edge not terminated. Then, a second set of alternate electrode layers is connected to an electrochemical cell to act as an anode and anodized so that an insulating coating is formed on an edge of the second set of alternate electrode layers opposing the terminated edge. Then the edge of the smaller body opposing the terminated edge is terminated in order to electrically connect the alternate electrodes not anodized.

The invention provides for devices with greater volume efficiency than those conventionally used.

Certain embodiments provide an electronic device having opposing top and bottom surfaces, opposing front and back surfaces, and opposing first and second side surfaces. The device has a marginless multilayer structure of electrode and dielectric layers, and the top and bottom surfaces of each layer of dielectric and electrode have substantially the same surface area. In addition, each electrode layer has an insulating coating on one of its front and back edges.

BRIEF DESCRIPTION OF THE DRAWINGS

Further objects, advantages and features of the present invention will become apparent from the detailed description, below, when read in conjunction with the accompanying drawings, in which

FIG. 3 is a perspective view of an electrical component body in accordance with the invention.

FIG. 4a is a perspective view of a chip in accordance with the invention.

FIG. 4b is a side cross section view of a portion of a chip in accordance with the invention.

FIG. 5 is a perspective view of an electrical component body in accordance with the invention, showing sectioning lines x—x and y—y, where the body can be cut into strips.

FIG. 6 is a perspective view of a strip showing sectioning line z—z.

DETAILED DESCRIPTION OF THE PREFERRED EMBODIMENTS

The following description is the best mode contemplated for carrying out the present invention. This description is made for the purpose of illustrating the principles of the invention and should not be taken in a limiting sense. The scope of the invention should be determined by reference to the appended claims.

Although it will be evident to those skilled in the art that the principles of the invention are applicable to a variety of electrical components and to methods for their fabrication, the following detailed description will focus chiefly on capacitors as an example. Additionally, it will be apparent that dimensions and layer thicknesses are not shown to scale.

Figure 1:
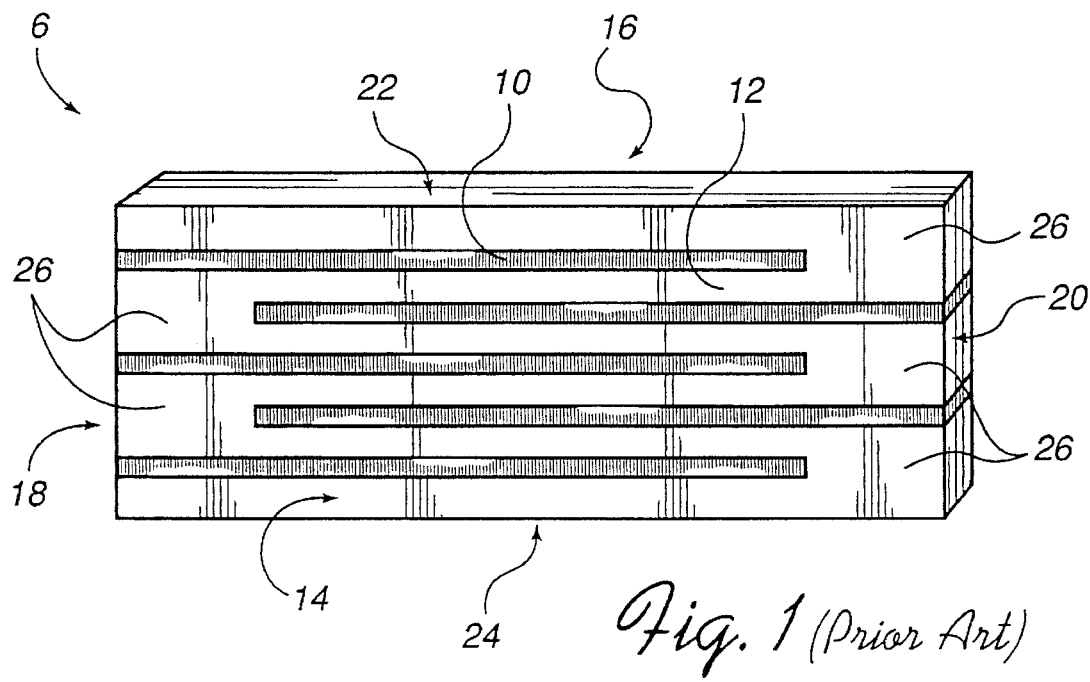
FIG. 1 is a perspective view of a prior art multilayer capacitor showing the end margins thereof.
Figure 2:
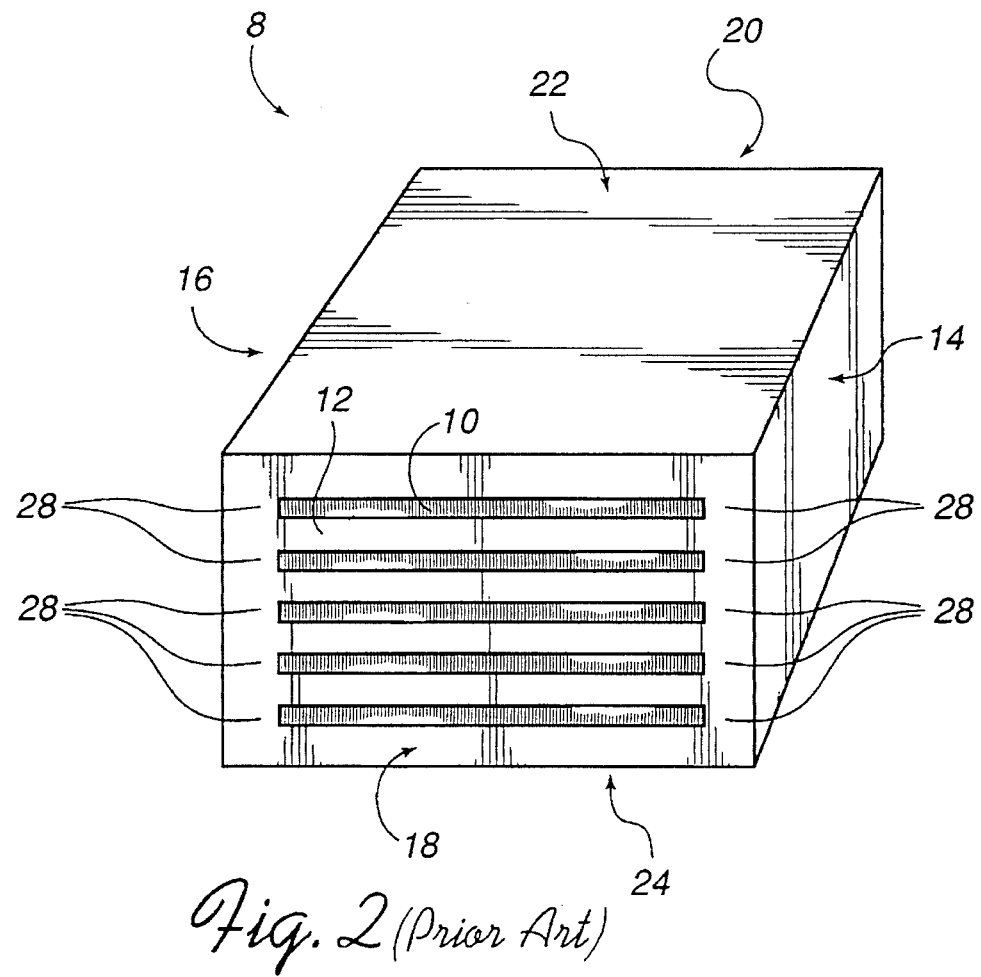
FIG. 2 is a perspective view of a prior art multilayer capacitor showing the side margins thereof.

FIGS. 1 and 2 show prior art multilayer electrical components 6 and 8, containing electrode layers 10 and dielectric layers 12. Each component has the shape of a rectangular prism having opposing front and back faces 14 and 16, opposing side faces 18 and 20, and top and bottom faces 22 and 24. The component shown in FIG. 1 contains end margins 26. The component shown in FIG. 2 contains side margins 28. The presence of these margins 26 & 28 leads to inefficient capacitors, for example, because the dielectric material within the margin area does not contribute to the capacitance of the device. The present invention allows for devices with little or no margins. In the case of capacitors, for example, the entire area of dielectric material will contribute to the capacitance of the device.

FIG. 3 shows a component body 28 in accordance with certain embodiments of the present invention. The body as it appears in FIG. 1 has opposing side faces 30 and 32, opposing front and back faces 34 and 36, and opposing top and bottom faces 38 and 40. The device has a layered structure, with alternating layers of electrodes 42 & 44 and dielectric 46 sitting atop a substrate 48. The top electrode layer 44 is coated with a passivation layer 50.

Each electrode layer extends to one side face, with electrode layers 42 extending to side face 30, and electrode layers 44 extending to side face 32. Additionally, electrode layers 42 are in contact with each other at side face 30, and electrode layers 44 are in contact with each other at side face 32.

The body 28 may be cut into strips 52, smaller strips 54, and individual chips 56 during subsequent manufacturing steps. The final chip 56 to be cut from the body shown in FIG. 1 may appear as shown in FIG. 4a with the electrode layers 42 & 44, and the dielectric layers 46 having approximately the same top and bottom surface areas. (FIG. 4a shows the chip 56 without terminations)

The manufacture of devices according to the present invention may proceed as follows. First, a substrate 48 such as alumina, quartz, or silicon is degreased and cleaned. Next, a first metal electrode layer 42 is deposited on the substrate 48, leaving an uncoated region of substrate between one side edge of the electrode layer 42 and the side face 32 (see FIG. 3). The distance between the side edge of the electrode layer 42 and the side face 32 may be 20 mils, for example.

The metal deposited may be one which can be oxidized by electrochemical anodization, including, but not limited to aluminum, titanium, tantalum, and nickel. The metal can be deposited by a variety of methods, including, but not limited to sputtering, evaporation, or screen printing.

A dielectric layer 46 is then deposited on top of the first metal electrode layer 42 and part of the uncoated substrate region 48, as shown in FIG. 3, leaving uncoated regions between the side edges of the dielectric layer 46 and the side faces 30 and 32 of the device. The distance between the side edges of the dielectric layer 46 and the side faces 30 and 32 may be 10 mils, for example.

The dielectric may be any dielectric material, for example, lead zirconium titanate, barium titanate, or strontium titanate. The dielectric layer 46 may be deposited by spincoating, dipcoating, spraycoating, CVD, MOCVD, laser ablation, or any physical vapor deposition method such as sputtering. Depending on the deposition method used, the dielectric layer may be fired individually or cofired. A dielectric material requiring low firing temperatures to densify and/or crystallize, such as 600° C. or less, is preferred so as to minimize the oxidation of the metal layers. Depending on the dielectric material, the deposition method, and the electrode material, the temperature used may vary considerably.

A second layer of metal electrode 44 is then deposited on top of the dielectric layer 46 and the remaining uncoated substrate region, using the same process as for the first layer of metal electrode 42, except that the uncoated region is left on the opposing side from the earlier uncoated region left after the first metal electrode layer 42 was deposited, as shown in FIG. 3. In addition, the electrode layer 44 extends down the side surface 32 to the substrate 48.

Next another layer of dielectric 46 is deposited, followed by another layer of electrode, and so forth, until the desired number of layers is built up. In the embodiment shown in FIG. 3, there are two electrodes 42 extending to side surface 30 and two electrodes 44 extending to side surface 32. It should be noted that the areas of each layer shown to bend at a right angle, such as areas 58 & 60, may have a smoother appearance than the sharp right angles shown in FIG. 3.

Depending on the deposition method used, the body may then be cofired to sinter (densify and/or crystallize) the dielectric.

If desired, the top surface may be passivated by coating the surface with a thin protective layer 50, as shown, for example, in FIG. 3. The passive coating may be a polymer such as polyethylene, and can be deposited using any technique including sputtering.

Depending on its dimensions, the body may be diced into strips 52 along dicing lines such as those shown in FIG. 5 as x—x and y—y, the dicing lines substantially parallel to the front face 34 and back face 36 of the body, and perpendicular to the side faces 30 & 32 of the body. The width of the strips 52 is determined by the desired chip size. For example, the width is 124 mils for an 0603 sized chip, and 164 mils for a 0805 sized chip. Depending on the desired width of each strip 52, the body may be diced any number of times.

Next, one set of metal electrode layers is connected to form the anode of an electrochemical cell, with the strip 52 placed into an electrolyte solution. For example, as shown in FIG. 5, metal electrode layers 44 at side face 32 may be connected to the electrochemical cell. The connection between alternate electrode layers 44 and the electrochemical cell is relatively easy because the alternate electrode layers 44 are already electrically connected to each other at side surface 32. Thus the side surface 32 can be brought into contact with the cell. This is easier than trying to connect each individual electrode layer to be anodized to the cell. In addition, the electrodes 42 which are not to be anodized are insulated from the cell.

The edges 43 of the metal electrode layers 44 exposed to the solution and connected to the cell will become anodized. For example, with aluminum layers in an electrolyte of dilute sulfuric acid ($H_2SO_4$), aluminum oxide (an insulator) will be formed on the electrode edges 43 at the front face 34 and back face 36 of each strip 52. Thus the electrode layers 44 connected to the cell will have a non-conducting anodization coating. The speed and degree of anodization can be controlled by the time and the current used.

Next the two longitudinal sides of each strip, (which as shown in FIG. 5 are the front face 34 and the back face 36) are terminated, so that the non-anodized set of electrodes 42 are electrically connected. This is performed using conventional termination techniques.

Next the strips 52 are diced along dicing line z—z, as shown in FIG. 6 with the width of the resultant strips 54 being about one half of their original width. Each resultant strip 54 will have either its longitudinal front face 34 or back face 36 terminated, with exposed electrodes on the opposing (freshly diced) face.

Then the metal electrode layers 42, which were not anodized before, are connected to the electrochemical cell at side surface 30. Next the resultant strip 54 is placed in the electrolyte solution and the exposed electrode surface of electrode layers 42 is anodized.

Then the longitudinal front or back surface which was not terminated previously is terminated. At this point the front face 34 and back face 36 of each resultant strip 54 is terminated, and alternate electrodes at the front face 34 and back face 36 have an anodization coating on them.

Then the resultant strips 54 are diced along a direction perpendicular to the front face 34 and back face 36 so that chips having the desired dimensions are formed. For the example of 0603 size, the distance between dicing is 30 mils. The chips diced from both side faces 30 & 32 can be discarded. These side face chips will not have the same structure as the rest of the chips, because they contain the regions connecting the electrode layers to one another. The rest of the chips will have diced side surfaces with exposed electrodes, which may be passivated by placing a layer (such as a polymer layer as discussed previously) onto these surfaces.

The resultant chips will be marginless components with a high volume efficiency, because the full area of the dielectric layers is bounded by electrode and utilized in storing charge. These devices have efficiency advantages over the prior art as shown in FIGS. 1 and 2, where end margins 26 and side margins 28 are used. The presence of these margins leads to inefficient capacitors, for example, because the full area of the dielectric does not contribute to the capacitance of the device. The present invention allows for devices with essentially no margins, wherein the top and bottom surface areas of the dielectric layers and electrode layers are essentially identical.

FIG. 4a is an example of a chip 56 according to the present invention, with the terminations removed, showing the marginless structure of electrode layers 42 & 44 and dielectric layers 46, as well as a substrate 40 and top surface passive layer 50. Each electrode layer 42 and 44 has an anodized edge 45 at either the front face 74 or opposing back face 78, over which the terminations 80 are applied. (See FIG. 4b). Side face 72 and its opposing side face 70 may be coated with a passive layer.

In addition, because the full area of dielectric is bounded by electrode, alignment problems internal to the body should not occur, and therefore the chips can be manufactured to close tolerances.

Based on the above description, one skilled in the art will understand that many modifications may be made without departing from the scope of the invention. It is apparent that the present invention is not limited to the materials and techniques mentioned above. For example, the dielectric layer may be an insulator or a semiconductor, or any material other than a metal.

In addition, other methods may be used for forming the capacitors and still be within the scope of the present invention. The method described earlier allows for relatively easy attachment of the electrode layers to the anodization cell. Alternatively, each layer could be deposited over the entire surface of the body, such that each layer has about the same surface area as the layer beneath it, and each layer extends to the edges of the body. The rest of the steps would be similar to those set forth earlier. Such a layer structure would be easier to deposit, but may be more difficult to anodize because the connection of alternate electrode layers to the anodization cell would be more difficult. This is because the alternate electrodes to be anodized would not be electrically connected to each other as in the method described earlier. In addition, the electrodes not to be anodized would have to be insulated from the electrochemical cell during the anodization step.

In an effort to use lower cost electrode materials which do not require the same high temperature properties, and to allow for the use of higher sintering temperature dielectric materials, metal impregnation techniques may be used, whereby fugitive electrodes are layered with the dielectric material.

After stacking layers of dielectric material and fugitive electrodes, the device is first heated to a low temperature of, for example, approximately 300°–400° C., in order to burn out the fugitive electrode. This leaves gaps into which true metal electrodes are infiltrated after the dielectric is sintered. The device is then fired so the dielectric can properly sinter at temperatures up to 1350° C. and higher.

The advantage of the metal impregnation technique is that lower cost metals can be used as electrodes, because the electrodes are not put in place until after the high temperature sintering of the ceramic dielectric has taken place.

In addition, the passivation layer placed on the top surface may not be necessary depending on the underlying layer, and the passivation layer may be deposited at various stages of the process, either prior to or after the body has been diced into chips.

The order of the layers may also be varied. For example, FIG. 3 shows the first layer above the substrate 48 being a metal electrode layer, though this need not be the case. The first layer could also be dielectric, followed by electrode, and so forth. In addition, extra dielectric layers may be added to the stack for protection.

The present invention can also be applied to manufacture other types of electrical components, including thick film capacitors, actuators, varistors, sensors, and methods for their manufacture.

By using a material exhibiting voltage dependent non-linear resistance, such as a zinc oxide based varistor composition, a varistor can readily be fabricated using the same basic steps as described above for capacitors. Similarly, a piezoelectric composition, for example, PMN (lead magnesium niobate) could be used to fabricate an actuator using the same basic steps.

For thick film devices, a substrate may not be needed. In such a case, the bottom layer would likely be a dielectric layer, and additional dielectric layers may be added to the top and bottom surfaces for protection.

As can be seen from the description, a variety of electrode and dielectric materials may be used to produce a variety of electronic devices according to the present invention.

What is claimed is:

1. An electronic device having opposite facing top and bottom surfaces, opposite facing front and back surfaces, and opposite facing first and second side surfaces, comprising:

a marginless multilayer structure of electrode and dielectric layers, each layer having opposite facing top and bottom surfaces, opposite facing front and back edges, and opposite facing first and second sides, and each electrode layer having an insulative coating on one of its front and back edges and being free of the insulative coating on the other of its front and back edges; wherein alternate electrode layers have the insulating coating on the same edge.

2. A device as defined in claim 1, wherein, the insulative coating is anodized electrode material.

3. A device as defined in claim 2, wherein at least one of the top, first side, and second side surfaces of the electronic device is coated with a passivating layer.

4. A device as defined in claim 1, further comprising:

a first termination on the front surface of the device, the first termination electrically contacting the front edge of alternate electrodes, wherein the front edge of the alternate electrodes is free of the insulative coating;

a second termination on the back surface of the device, the second termination electrically contacting the back edge of alternate electrodes free of the insulative coating, wherein the back edge of the alternate electrodes is free of the insulative coating.

5. A device as defined in claim 1, wherein the device is a thin film capacitor comprising a substrate material disposed below the layers of electrode and dielectric.

6. A device as defined in claim 1, wherein the device is an electronic component selected from the group of a thin film capacitor, thick film capacitor, actuator, varistor, and a sensor.

7. A electronic device having a multilayer structure and including opposing top and bottom surfaces, opposing front and back surfaces, and opposing first and second side surfaces, comprising:

non-metal layers, metal electrode layers, wherein each electrode layer has edges located at the front and back surfaces;

a marginless structure wherein the non-metal layers and electrode layers have substantially the same top and bottom surface area;

an oxide coating on one of the front and back edges of each electrode layer, with alternate electrode layers having the oxide coating on the same edge;

a first termination which electrically connects alternate electrode layers on the front surface of the device; and a second termination which electrically connects alternate electrode layers on the back surface of the device.

8. A device as defined in claim 7, wherein the insulating coating is anodized electrode metal.

9. An electronic device as defined in claim 8, wherein the device is an electronic component selected from one of the group of a thin film capacitor, thick film capacitor, actuator, varistor, and a sensor.

10. A device as in claim 1, wherein the first and second edges of each dielectric layer are free of the insulative coating on the electrode layers.

11. A device as defined in claim 7, wherein a polymer passivation layer is deposited onto at least one of the top, first side, and second side surfaces of the electronic device.

12. A device as defined in claim 7, wherein the device is a thin film capacitor comprising a substrate material, the substrate material supporting the layers of electrode and dielectric.

13. A device as defined in claim 7, wherein the device is an electronic component selected from the group of a thin film capacitor, thick film capacitor, actuator, varistor, and a sensor.

14. A multilayer electrical device having adjacent electrode and non-electrode layers, the electrode layers having opposing first and second edges, the device comprising:

a set of first alternate electrode layers;

a set of second alternate electrode layers;

each first alternate electrode layer including an anodization coating on the first edge of the layer and an absence of anodization coating on the opposing second edge of the layer;

each second alternate electrode layer including an anodization coating on the second edge of the layer and an absence of anodization coating on the opposing first edge of the layer;

a first termination electrically connecting the first set of alternate electrode layers, the first termination contacting the first set of alternate electrode layers on the second edge of each layer; and a second termination connecting the second set of alternate electrode layers, the second termination contacting the second set of alternate electrode layers on the first edge of each layer.

15. A device as in claim 14, further comprising a substrate material supporting the electrode and non-electrode layers.

16. A device as in claim 14, wherein the electrode layers and non-electrode layers are sized to create a marginless device.

17. A device according to claim 14, the device including opposing top and bottom surfaces, opposing front and back surfaces, and opposing side surfaces; and a passivation coating disposed on at least one surface of the device.

18. A device as defined in claim 14, wherein the device is an electronic component selected from the group of a thin film capacitor, thick film capacitor, actuator, varistor, and a sensor.

19. A multilayer capacitor having alternating layers of electrodes and dielectric material, the capacitor defining opposite facing first and second surfaces, the capacitor including terminations disposed on the first and second surfaces, the capacitor comprising:

anodizable electrodes extending from the first surface to the second surface of the capacitor; and each electrode including an anodized portion on one of the first and second surfaces, the anodized portion insulating the electrode from the adjacent termination.

* * * * *